Jan. 20, 1925.
B. R. BENJAMIN ET AL
1,523,470
SHOCKER
Filed July 26, 1919
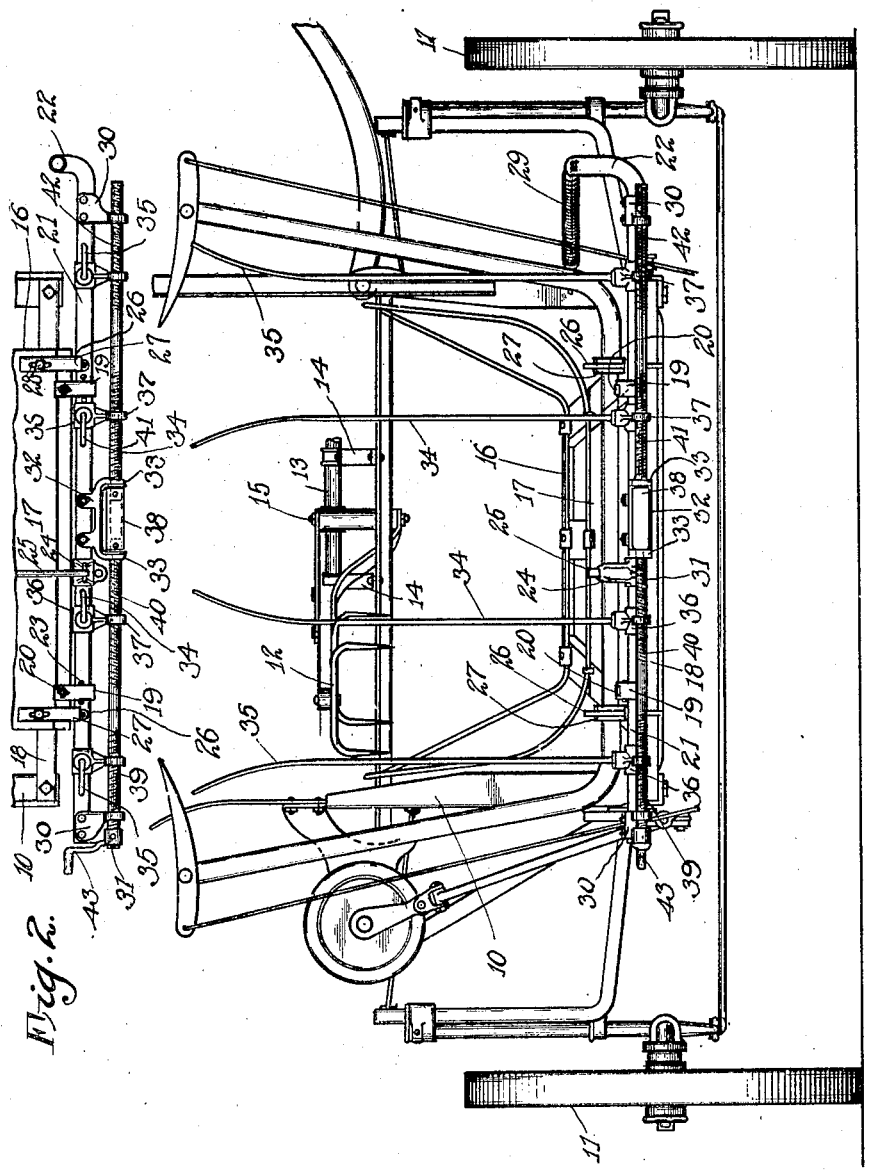
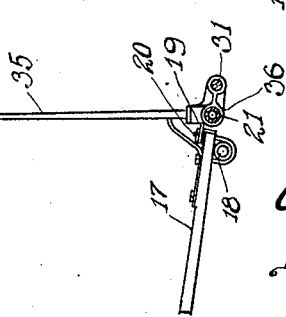
Inventors:
Bert R. Benjamin
Clemma R Raney,
By Chas E. Lord
Atty.

Patented Jan. 20, 1925.

1,523,470

UNITED STATES PATENT OFFICE.

BERT R. BENJAMIN, OF OAK PARK, AND CLEMMA R. RANEY, OF CHICAGO, ILLINOIS, ASSIGNORS TO INTERNATIONAL HARVESTER COMPANY, A CORPORATION OF NEW JERSEY.

SHOCKER.

Application filed July 26, 1919. Serial No. 313,612.

*To all whom it may concern:*

Be it known that we, BERT R. BENJAMIN and CLEMMA R. RANEY, citizens of the United States, and residents, respectively, of Oak Park, in the county of Cook and State of Illinois, and of Chicago, in the county of Cook and State of Illinois, have invented certain new and useful Improvements in Shockers, of which the following is a full, clear, and exact specification.

This invention relates to shockers, and more particularly to improvements in shockers of the standard type, such as illustrated in Patent #1,226,374 granted to C. R. Raney, May 15, 1917.

If a shocker is to operate successfully and to properly set shocks in the field, the shocks must be so constructed that the butts thereof will be materially larger than the heads, for otherwise the shock will topple over when it is being set, or after it has been set. It is also particularly desirable that the butt of the shock have sufficient length in the direction of the line of travel of the machine to withstand the jar of being deposited on the field and to set firmly on its base. It has ben difficult with shockers as previously constructed to regulate the size of the shock butts under the varying conditions of grain, since the mechanism which will operate properly with short grain and will properly position the sheaves to form the right size of butt, would not operate successfully under conditions where longer grain was handled.

The present invention has for its object therefore to provide means for building shocks with the butts relatively larger than the heads.

A further object is to provide a construction by means of which the size of the shock butts may be regulated, whereby the machine may be adapted for use in all conditions of grain.

A still further object is to produce a shock with a butt of sufficient length and width to set firmly in the field.

As above stated, the improvement covered by this application has been worked out in connection with the standard type of shocker in which the sheaves are alternately deposited upon opposite sides of a shocker cradle or receptacle, and in the present embodiment, the butt regulating mechanism comprises a series of tines disposed adjacent the rear end of the shock receptacle. These tines are adapted to be engaged by the butts of the sheaves of grain as they are deposited in the receptacle by the sheaf delivery fork, and means has been provided for regulating the position of these tines with respect to each other whereby the butts of the sheaves may be deposited at different distances from the longitudinal center of the receptacle. The tines are also adapted to change the shape of the butts by confining them in a manner to regulate the length of the butt of the shock. In the particular embodiment illustrated, this last result has been accomplished by means of adjustably mounting the tines on a rod to which they are connected by a screw-thread adjustment. Other means for adjusting the tines may of course be utilized if desired.

We have illustrated in the accompanying drawings one embodiment of the invention, and in these drawings—

Fig. 1 illustrates a rear elevational view of a shocker of the standard type, provided with our improved construction;

Fig. 2 is a top plan view of the rear end of the shocker, shown in Fig. 1; and

Fig. 3 is a sectional detail view illustrating the mounting of the tines.

The shocker illustrated comprises a frame 10 suitably mounted on carrying wheels 11, the front end of the shocker being supported on a transverse support carried by the binder; the support and binder being fully shown in Patent #1,226,374 above referred to. A sheaf delivery fork 12 is rotatably mounted on a shaft 13 carried by vertical standards 14 connected to the shocker frame, the fork being alternately reciprocable upon a vertical axis 15 to the opposite sides of the sheaf receptacle 16; this construction also being fully shown and described in the patent referred to. The sheaf receptacle 16 is provided with a bottom 17 pivoted on a transverse support 18 carried by the shocker frame, the receptacle being upwardly and rearwardly tiltable on the support 18 for dumping the shock. Journal brackets 19 are bolted, as shown at 20, to the bottom 17 of the shock receptacle, and these brackets have journaled therein a rotatable transverse support or pipe 21 having a crank arm 22 preferably formed integral therewith at one end. Cotter pins 23 are carried by the pipe 21 adjacent the brackets 19 and prevent any longitudinal movement of the pipe in the brackets. The pipe 21 is also provided with an upstanding lug 24 which is normally engaged by a pawl 25 and prevents the rotation of the pipe 21 in one direction when the pipe and receptacle are in sheaf receiving position. Suitable means is provided for releasing pawl 25 automatically as the receptacle is tilted, but as this construction is fully described and claimed in the Raney patent referred to, the details of the pawl releasing mechanism are not illustrated or described in the present application. Means is also provided for limiting the rotational movement of the pipe in the opposite direction, this means comprising a pair of upwardly projecting studs 26 suitably secured to the pipe and adapted to engage stops 27 adjustably secured by a pin and slot connection 28 to the bottom 17 of the sheaf receptacle. By longitudinally adjusting the stops 27 the normal position of the pipe 21 and the tines carried thereby may be determined. A spring 29 is secured at one end to the offset end or crank arm 22 and at its opposite end to a portion of the frame 10 of the shocker, this spring acting to return the pipe 21 and the tines carried thereby to its normal position after the shock has been dumped.

The construction above described is all shown in detail and described in the Raney patent referred to, and therefore further description and showing of this construction in this application is believed to be unnecessary.

In the Raney patent noted, the end tines which are carried adjacent to the rear end of the receptacle, are rigidly mounted on the pipe 21, and no adjustment for these tines is provided for. In the present instance, however, these tines are adjustably mounted and the manner of mounting and adjusting these members will next be described.

Brackets 30 are carried by the pipe 21 adjacent its outer ends, and these brackets support a sectional transverse adjusting shaft 31 journaled in the brackets 30; a central bracket 32 is also secured to the pipe 21 and is provided with rearwardly extending lugs 33 which also support the central portion of the shaft 31 in a manner hereinafter described. In the present embodiment of the invention four end tines are provided, two of these tines indicated at 34 being inwardly curved and disposed nearer the longitudinal center of the pipe 21, the other two, as indicated at 35, being outwardly curved and being positioned adjacent the outer ends of the pipe. The tines 34 and 35 are secured at their lower ends to sleeve members 36 slidably carried by the pipe 21, these sleeve members having formed integral therewith rearwardly extending lugs 37, the rear ends of these lugs being screw-threaded and mounted on the shaft 31. The shaft 31 is in the present instance made sectional, the inner ends of the shaft sections being secured to and joined by a sleeve 38 which is positioned between the rearwardly extending lugs 33 carried by the journal bracket 32, the engagement of this sleeve 38 with the lugs preventing any longitudinal movement of the shaft 31. The shaft is screw-threaded in a manner which will next be described in order to provide an adjustment for the tines 34 and 35.

As clearly illustrated in Figs. 1 and 2, the left hand end of the shaft is provided, as shown at 39, with a right hand thread, the next threaded portion 40 being threaded in the opposite direction, or having a left hand thread, the portion of the shaft to the right of the bracket 32 being provided with a right hand thread 41 and the right hand end portion being provided with a left hand thread 42. In other words, the shaft 31 is alternately threaded right and left, starting from the left hand end. A crank 43 is mounted on the left hand end of the shaft, and by means of this crank the shaft may be rotated in order to adjust the tines.

Having described the construction of our improvements in the shocking mechanism, we will next outline the operation of this construction.

From the nature of the screw threads on the shaft 31 it will be readily seen as the shaft is rotated in one direction by means of the crank 43, the tines 35 will be moved inwardly toward the longitudinal center of the shock receptacle, and the tines 34 will be moved outwardly away from the longitudinal center, and as the shaft is rotated in the opposite direction, the tines 35 will be moved outwardly and the tines 34 will be moved inwardly. As the sheaf delivery fork 12 alternately delivers the sheaves to opposite sides of the receptacle, if it is desired to space or spread the butts of the sheaves in order to form a larger butt for the shock, the shaft 31 will be rotated in a direction to move the tines 34 away from the longitudinal center of the machine and to move the tines 35 inwardly or toward the center. The tines 34 and 35 will then engage the sheaf butts and guide them away from the longitudinal center of the machine, and will also squeeze the butts making them narrow and longer and thereby making the butt of the shock longer. In the construction illustrated, if the crank 43 is turned in a clockwise direction, the outer tines 35 will be moved away from the center and the inner tines 34 will be moved toward the center of the shock receptacle, and when the crank is turned in the opposite direction, the opposite result will take place. When the machine is operated in short grain it will be found advisable to move the tines 34 inwardly toward the center, since the height of the shock will be less and therefore a smaller butt will be necessary. However, if the machine is to be operated in long grain, the butts should be spaced further apart and therefore the tines 34 should be moved away from the center or toward the sides of the receptacle in order that the sheaves which engage the inwardly curved upper ends of these tines may be carried away from the center, thereby forming a wider butt for the shock.

From the above description it will be seen that a simple and efficient construction has been provided, by means of which the operator may easily control the position and the shape of the sheaf butts in the receptacle, and thereby the size of the butt of the shock deposited.

Also, by making a simple adjustment, the position of the end tines may be regulated so that the machine will operate equally well in long or short grain.

While we have in the above specification described one specific embodiment of this invention, it should be understood that the invention is capable of modifications, and that modifications and changes in the construction and arrangement of the various parts may be made without departing from the spirit and scope of the invention, as expressed by the following claims:

1. In a shocking machine, a shock receptacle, sheaf delivery means for depositing sheaves in said receptacle, and bodily adjustable means operatively connected to said receptacle for positioning the sheaves as they are delivered to said receptacle.

2. In a shocking machine, a shock receptacle, sheaf delivery means for depositing sheaves in said receptacle, and means operatively connected to said receptacle and bodily and laterally adjustable with respect to said receptacle for positioning the sheaves as they are delivered to said receptacle.

3. In a shocking machine, a shock receptacle, sheaf delivery means for depositing sheaves in said receptacle, and bodily adjustable means operatively connected to said receptacle and disposed in the path of the butts of the sheaves for positioning the sheaves as they are delivered to said receptacle.

4. In a shocking machine, a shock receptacle, sheaf delivery means for depositing sheaves in said receptacle and laterally adjustable tines operatively connected to said receptacle and disposed adjacent the rear end thereof for positioning the butts of the sheaves as said sheaves are delivered to said receptacle.

5. In a shocking machine, a shock receptacle, means for delivering sheaves into said receptacle, tines disposed adjacent the rear end of said receptacle and adapted to be engaged by the butts of the sheaves deposited therein, and means for adjusting the position of said tines toward or from the longitudinal center of said shock receptacle.

6. In a shocking machine, a shock receptacle, means for delivering the sheaves into said receptacle, a plurality of end tines carried by said receptacle and disposed adjacent the rear end thereof, and means connecting said tines for simultaneously adjusting said tines in such a manner that certain of said tines will be moved in one direction and certain other of said tines will be moved in the opposite direction with respect to the longitudinal center of said shock receptacle.

7. In a shocking machine, a shock receptacle, means for depositing sheaves in said receptacle, a plurality of tines disposed adjacent the rear end of said receptacle and in the path of the butts of the sheaves deposited therein, certain of said tines being disposed adjacent the lateral sides of said receptacle and certain of said tines being disposed adjacent the longitudinal center of said receptacle, and means for simultaneously adjusting said centrally disposed tines toward or from the longitudinal center of said receptacle.

8. In a shocking machine, a shock receptacle, means for depositing sheaves in said receptacle, sheaf positioning means carried by said receptacle, and means operatively connected to said sheaf positioning means for simultaneously adjusting certain of said positioning means in one direction as certain others of said positioning means are adjusted in the opposite direction with respect to the longitudinal center of said receptacle.

9. In a shocking machine, a shock receptacle, means for depositing sheaves therein, means disposed in the path of the butts of the sheaves for positioning said butts in said receptacle, said means comprising a plurality of members disposed across the rear end of said receptacle, and means for simultaneously oppositely adjusting adjacent members with respect to the longitudinal center of said receptacle.

10. In a shocker, a shock receptacle, means for depositing sheaves in said receptacle, and means extending transversely with respect to the longitudinal center of said receptacle for engaging the butts of the sheaves as they are deposited in said receptacle for enlarging the shape of said butts.

11. In a shocker, a shock receptacle, means for depositing sheaves in said receptacle, and means positioned transversely at the rear of said receptacle engaging the butts of the sheaves as they are deposited in said receptacle for enlarging the shape of said butts.

12. In a shocker, a shock receptacle, means for depositing sheaves in said receptacle, and adjustable inwardly curved tines engaging the butts of the sheaves as they are deposited in said receptacle for enlarging the shape of said butts.

13. In a shocker, a shock receptacle, means for depositing sheaves in said receptacle, and adjustable outwardly curved tines for engaging the sheaf butts and squeezing said butts as they are deposited in said receptacle.

14. In a shocking machine, a receptacle, means for depositing sheaves in said receptacle, a plurality of tines disposed adjacent the rear end of said receptacle and in the path of the butts of the sheaves deposited therein, certain of said tines being disposed adjacent the lateral sides of said receptacle and certain of said tines being disposed adjacent the longitudinal center of said receptacle, and means for simultaneously adjusting said centrally disposed tines towards said tines disposed adjacent the sides of said receptacle.

15. In a shocking machine, a receptacle, means for depositing sheaves in said receptacle, a plurality of tines disposed adjacent the rear end of said receptacle and in the path of the butts of the sheaves deposited therein, certain of said tines being disposed adjacent the lateral sides of said receptacle and certain of said tines being disposed adjacent the longitudinal center of said receptacle, and means for simultaneously adjusting said centrally disposed tines toward each other and adjusting said tines disposed at the side of said receptacle away from each other.

16. In a shocking machine, a receptacle, means for depositing sheaves in said receptacle, a plurality of tines disposed adjacent the rear end of said receptacle and in the path of the butts of the sheaves deposited therein, certain of said tines being disposed adjacent the lateral sides of said receptacle and certain of said tines being disposed adjacent the longitudinal center of said receptacle, and means for simultaneously adjusting said centrally disposed tines toward or away from each other and adjusting said tines disposed at the sides of said receptacle toward or away from each other.

In testimony whereof we affix our signatures, in the presence of two witnesses.

BERT R. BENJAMIN.
CLEMMA R. RANEY.

Witnesses:
A. H. BLOOM,
FRANK A. ZABILKA.